W. B. GUY.
DEHYDRATING PLANT.
APPLICATION FILED APR. 14, 1921.
1,412,684.
Patented Apr. 11, 1922.
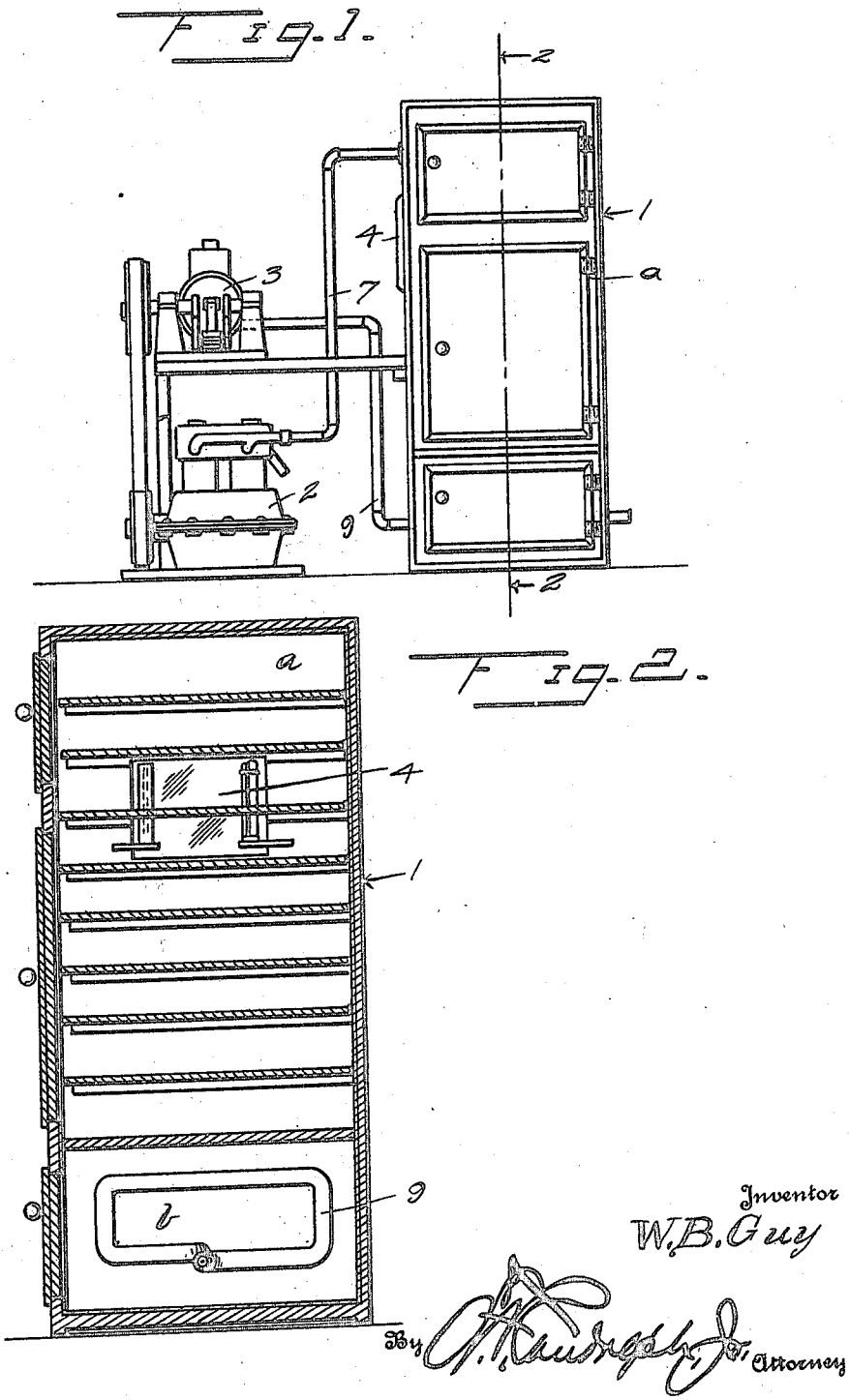

UNITED STATES PATENT OFFICE.

WALTER B. GUY, OF ST. AUGUSTINE, FLORIDA.

DEHYDRATING PLANT.

1,412,684. Specification of Letters Patent. Patented Apr. 11, 1922.

Application filed April 14, 1921. Serial No. 461,362.

*To all whom it may concern:*

Be it known that I, WALTER B. GUY, a citizen of the United States, residing at St. Augustine, in the county of St. Johns and State of Florida, have invented certain new and useful Improvements in Dehydrating Plants; and I do hereby declare the following to be a full, clear, and exact description of the invention, such as will enable others skilled in the art to which it appertains to make and use the same.

Food stuffs, chiefly fruits and vegetables, are conserved for future use by a desiccating process. This process is usually conducted at normal atmospheric pressure with or without heat and is necessarily slow and requires an extensive plant if carried on to any extent on a financial basis.

The present invention materially facilitates the process and enables a relatively low temperature to be employed when using heat as means for supplementing the curing process.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

In the accompanying drawing:

Figure 1 is a view in front elevation of the dehydrating plant constructed in accordance with my invention, and Figure 2 is a sectional view taken on the vertical plane indicated by the line 2—2 of Figure 1, looking in the direction indicated by the arrows.

The plant includes a cabinet 1 or like structure, for receiving the article of food to be treated. The cabinet is usually subdivided into chambers $a$ and $b$. The chamber $a$ is designed to receive the article of food to be treated, whereas the chamber $b$ is adapted to receive the heating agent or the fluid medium when treating the article chemically, as with fumes of sulphur. Access is had to the respective chambers by means of door controlled openings, as indicated in the drawing. The food chamber $a$ is usually shelved and the chamber $b$ may or may not be provided with shelves. A glass panel 4 is provided in a side of the food chamber to admit of the interior thereof being observed and for disclosing instruments, such as a thermometer and barometer for indicating temperature and atmospheric pressure.

In accordance with the present invention, the food chamber $a$ is adapted to have the air exhausted therefrom, whereby to facilitate the desiccating process and for this purpose a vacuum pump 2 of any desired construction and make is provided and is connected by means of a pipe 7 with the food chamber. The vacuum pump 2 is adapted to be operated by means of an engine 3 of any type, such as steam or internal combustion. The exhaust from the engine 3 is conveyed by means of a pipe 9 to the chamber $b$ for heating the food chamber and thereby materially hastening the desiccating process. It is also observed that the chamber $b$ may receive a fluid medium, such as the fumes of sulphur, when it is required to subject the food to such treatment.

The present invention not only materially facilitates the process but preserves the flavor and vitality of the fruit or vegetable treated. Moreover, by exhausting the air from the food chamber, the vapor eliminated from the article of food under treatment is quickly carried off and when heat is employed, the temperature may be relatively low, thereby obviating the chance for overheating or burning of the food.

What is claimed is:

1. A food conserving plant including a cabinet subdivided into chambers, the one for receiving the food to be treated and the other adapted to receive a heating medium, a vacuum pump for exhausting the air from the food chamber, and an engine for operating the vacuum pump and delivering its exhaust into the heating chamber.

2. A food conserving plant including a cabinet subdivided into chambers, the one for receiving the food to be treated and the other adapted to receive a heating medium, a vacuum pump for exhausting the air from the food chamber, and an engine for operating the vacuum pump and delivering its exhaust into the heating chamber, said chambers having door controlled openings to admit of ready access thereto, and the food chamber being further provided with a glass panel whereby the interior of the chamber may be under observation and instruments placed therein, such as a thermometer and barometer, and easily read.

In testimony whereof I affix my signature in presence of two witnesses.

WALTER B. GUY.

Witnesses:
  LEVERETT F. ENGLESBY,
  A. W. UNDERWOOD.